United States Patent [19]

Lendi et al.

[11] 4,031,632

[45] June 28, 1977

[54] CENTERING AND MEASURING HEAD FOR MEASURING MACHINES

[75] Inventors: Georges Lendi, Crissier; Serge R. Ginggen, Renens; Gildo Vadi, Cottens, all of Switzerland

[73] Assignee: Tesa S.A., Renens, Switzerland

[22] Filed: Sept. 29, 1975

[21] Appl. No.: 617,384

[30] Foreign Application Priority Data

Oct. 24, 1974 Switzerland ............... 14228/74

[52] U.S. Cl. ...................... 33/178 R; 33/147 K; 33/149 B; 33/164 C; 33/169 C; 33/178 E
[51] Int. Cl.² ...................... G01B 5/08; G01B 7/12
[58] Field of Search ......... 33/178 F, 178 R, 169 C, 33/178 E, 191, 174 L, 174 R, 172 D, 147 K, 149 R, 149 B, 164 C

[56] References Cited

UNITED STATES PATENTS

| | | | |
|---|---|---|---|
| 2,247,797 | 7/1941 | Anderson | 33/164 C |
| 2,302,355 | 11/1942 | Sumner | 33/178 R |
| 2,434,535 | 1/1948 | Anders | 33/178 R |
| 2,494,287 | 1/1950 | Darnell | 33/191 |
| 2,497,990 | 2/1950 | Huber et al. | 33/178 F |
| 2,618,069 | 11/1952 | Rinker | 33/164 X |
| 2,638,681 | 5/1953 | Kinley et al. | 33/178 F X |
| 2,973,583 | 3/1961 | Stolle et al. | 33/178 F |
| 2,994,962 | 8/1961 | Lebourg | 33/178 F |
| 3,352,021 | 11/1967 | Leach et al. | 33/178 R |

Primary Examiner—Richard E. Aegerter
Assistant Examiner—John W. Shepperd
Attorney, Agent, or Firm—Anthony J. Casella

[57] ABSTRACT

A centering and measuring head for measuring machines, comprising a tubular body in which a piston is slidably mounted and subjected to the continuous action of biassing means, at least two centering contact pieces mounted to pivot on shafts provided in the body tangentially on an imaginary circle concentric with the axis of the piston, the movements of the said centering contact pieces being controlled by the said piston, and means for monitoring the displacements of the piston against the action of the biassing restraining element.

4 Claims, 4 Drawing Figures

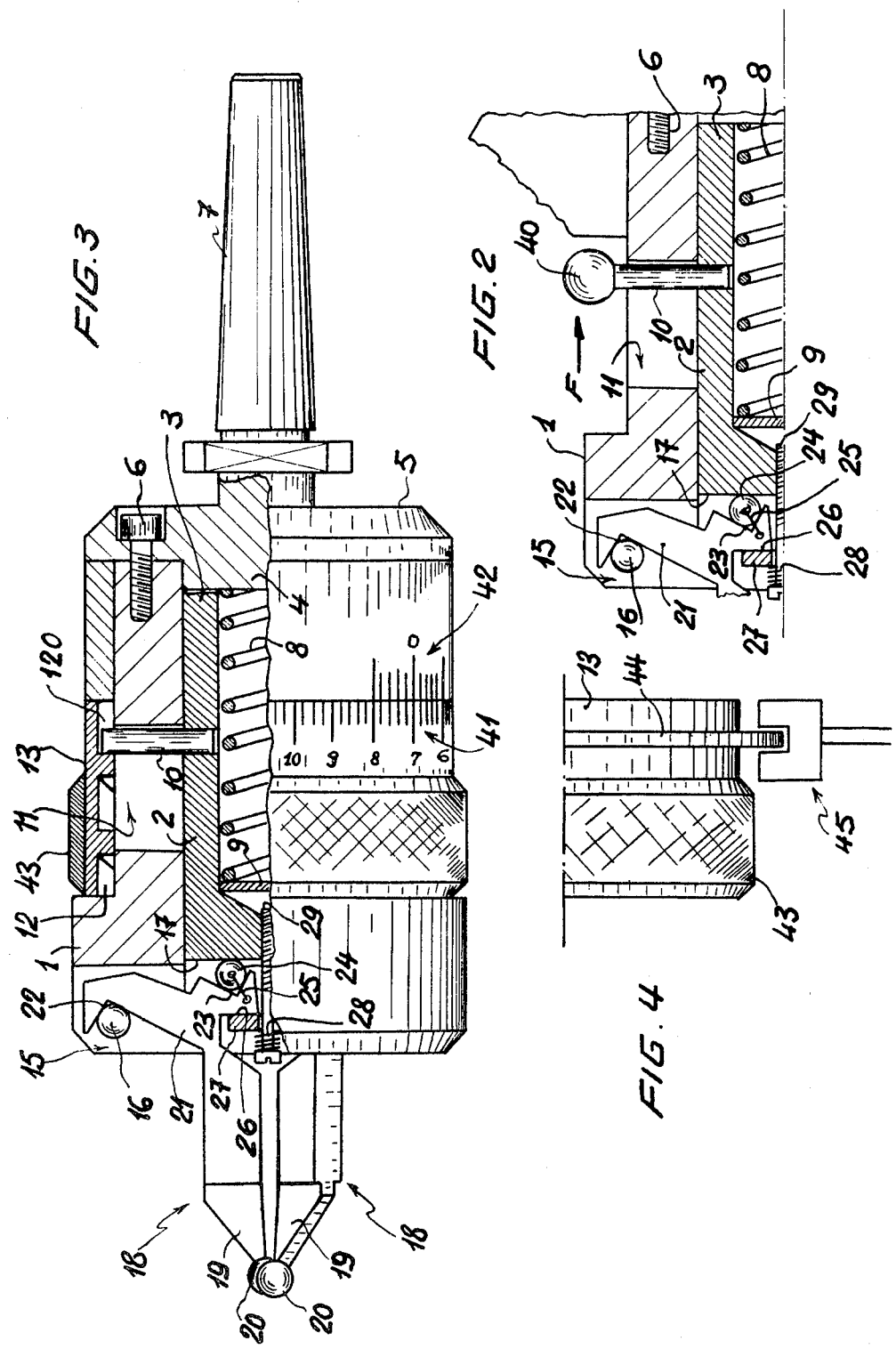

CENTERING AND MEASURING HEAD FOR MEASURING MACHINES

Measuring machines are known in which a moveable table is freely displaced along two perpendicular X and Y axes to centre on a shaft Z perpendicular to the X and Y, a bore formed in the said table for the purpose of measuring the positioning of the bore in the system of co-ordinates X and Y. According to one arrangement, the table is fixed, whilst it is the shaft Z which is displaced along the axes X and Y to become centered in the bore.

These systems ensure an excellent system of locating movements, but a difficulty resides in the fact that it is not easy to centre the bore on the shaft Z, a feature which makes positioning measurements delicate and slow.

In order to surmount these disadvantages, it is an object of the present invention to provide a centering and measuring head for measuring machines.

According to the present invention a centering and measuring head for a measuring machine comprises a tubular body in which a piston is slidably mounted and subjected to the continuous action of a restraining elastic element or the like biasing means, at least two centering contact pieces mounted to pivot on spindles arranged in the body tangentially to an imaginary circled concentric with the axis of the piston, the movements of the said centering contact pieces being controlled by the said piston, and means for monitoring the displacements of the piston against the action of the elastic restraining element.

The invention will be described further, by way of example, with reference to the accompanying drawings, in which:

FIG. 2 is a partial longitudinal section through a modification of the embodiment shown in FIG. 1;

FIG. 3 is a partial longitudinal section through a second embodiment;

FIG. 4 is a partial longidudinal view of a detail of a modification of the embodiment shown in FIG. 3.

Figure 1:
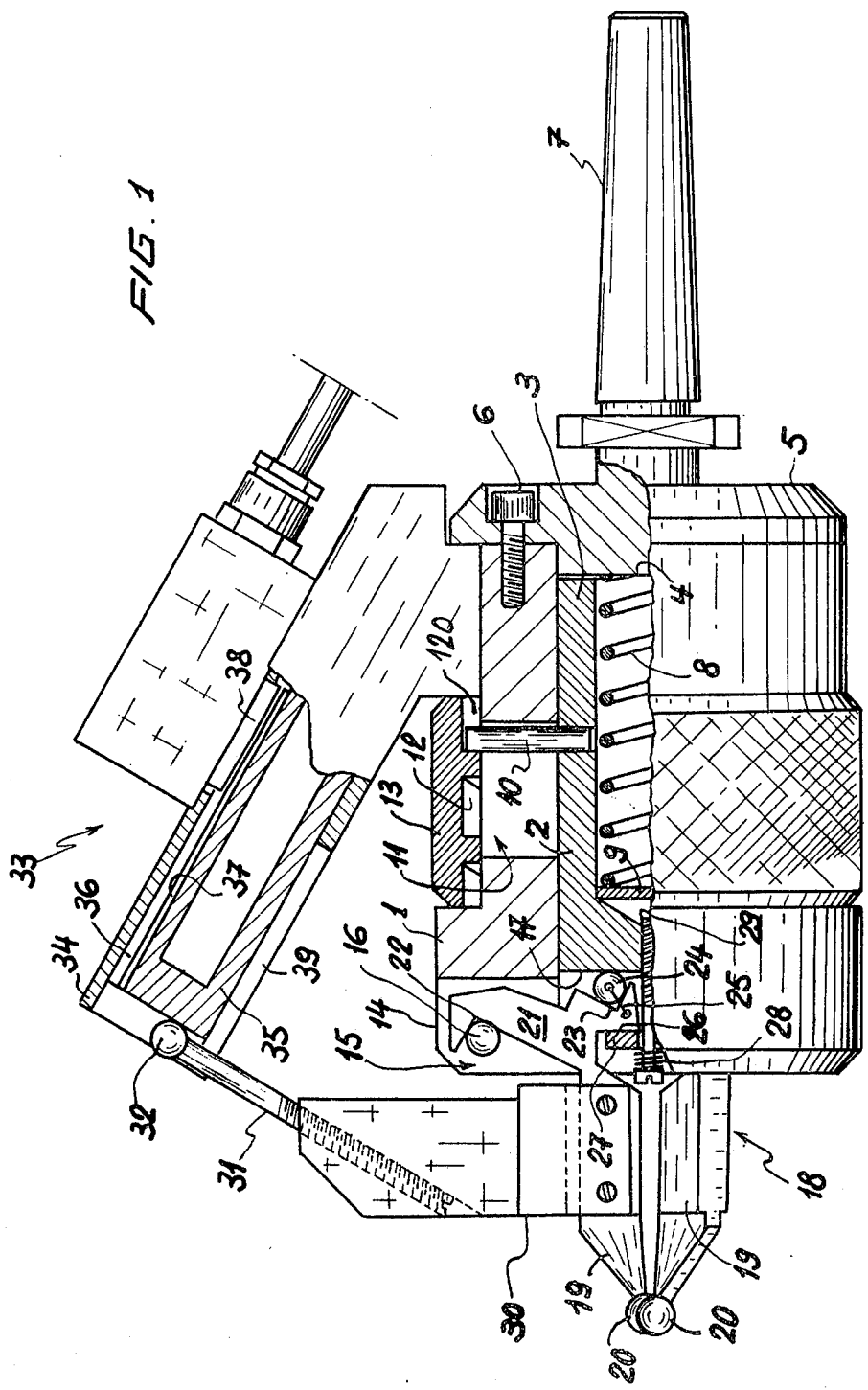
FIG. 1 is a partial longitudinal section through a first embodiment.

A centering head is shown in FIG. 1 and comprises a tubular body 1 in which a piston 2 is slidably mounted and has a jacket 3 which is disposed in front of a circular shoulder 4 introduced into the body 1 and provided on a closure plate 5 secured to the rear end of the body 1 by means of screws 6. The plate 5 supports a clamping or gripping cone 7 co-axial with the piston 2 and by means of which the centering head may be secured to a spindle Z of a measuring machine (not shown), for example, in the spike forming said spindle Z.

The piston 2 has a restraining compression on spring 8— one end of which bears against the shoulder 4 of the plate 5 and the other end of which abuts a disc 9 located in the bottom of the piston 2 and bearing against said piston. A gudgeon or cross pin 10 is force-fitted, for example, into the wall of the jacket 3 and extends through a longitudinal slot 11 formed in the body 1 and extends therefrom to engate in a helical groove 12 in a control ring 13 mounted to rotate on the body 1. The helical groove 12 has a cross section greater than that of the pin 10 so that there is a certain amount of play between these two members in the direction of the longitudinal axis of the piston 2 and the helical groove 12 also extends into a co-axial circular groove 120.

The front part 14 of the body 1 is open and a head 17 of the piston 2 extends into this front part. The wall of the front part 14 has three radial openings 15 disposed at a 120° relatively to one another in each of which there extends a transverse shaft 16; said shafts 16 being tangential with an imaginary circle concentric with the axis of the piston 2.

A centering key 18 is provided in each of the radial openings 15 and comprises a contact arm 19 extending out of the body 1 and terminating in a ball 20; said contact arm 19 being connected to a control arm 21 disposed in the opening 15 and said arms being generally L-shaped. The control arm 21 has two alternate V-shaped recesses 22 and 23 respectively disposed at its ends and the points or ridge of which are parallel to each other. The V-recess 22 is a centering and pivoting recess and is disposed on the opposite side of the head 17 of the piston 2 and engaged on the transverse shaft 16 with its ridge parallel thereto. The V-recess 23 is a bearing recess and is located opposite to the end 17 of the piston 2. A cylindrical pin 24 is located in the recess 23 parallel with the ridge of the said recess and kept in position with a certain degree of floating or undulation by a bar 25 inserted into its ends and extending through the arm 21. The arm 21 opposite the bearing V-recess 23 has a shoulder 26 against which a washer 27 is disposed between the three centering keys 18 and subjected to the action of a compression spring 28 secured by the head of a screw 29 passing between the three arms 21 to engage in a corresponding thread in the head 17 of the piston 2. Hence, under the action of the spring 28, the washer 27 exerts a force on the shoulders 26 of the centering keys 18 which pushes the V-bearing recesses 23 in the direction of the piston 2 and presses the pins 24 against the head 17 of the piston. Due to their floating arrangement, the pins 24 are automatically positioned in their respective recesses.

The centering head thus described operates as follows:

Since the gripping cone 7 is secured to the spindle forming the axis Z of the measuring machine, the centering head is displaced longitudinally to bring the centering keys 18 into the bore which has to be centered and is provided in the table machine. The control ring 13 is then rotated, causing the helical groove 12 to pass the end of the pin 10. Since the pin 10 bears against the helical groove 12 by the bias of the spring 8 on the piston 2, an axial displacement of the said pin is effected along the slot 11 at the same rate as the movement of the helical groove 12, thus permitting displacement of the piston 2. During the displacement of the piston 2, the head 17 thereof repels the pins 24 which transmit this push to the bearing V-members 23, the centering keys 18 pivot round the shafts 16 and the contact arms 19 separate. Rotation of the control ring 13 is continued until the balls 20 come into contact with the walls of the bore and displace it with the moveable table along the axes X and Y in order to center it on the shaft Z, or displace the shaft Z to centre it on the bore if the table is stationary.

Due to the fact that the cross section of the helical groove 12 is greater than that of the pin 10, when the balls 20 of the centering keys 18 are in contact with the walls of the bore, the control ring 13 has a certain angular play relative to the pin 10 and the bearing force with which the centering keys 18 effect the centering of the bore and its retention in the centre position is achieved by the spring 8 alone.

In order to disengage the centering head, it is only necessary to turn the control ring 13 in the reverse direction for the helical groove to compel the pin 10 to be displaced axially along the slot 11 so that the said pin drives the piston 2 against the action of the spring 8. The piston 2 engages the screw 29, the spring 28 and the washer 27 which bears against the shoulders 26 of the centering keys 18 and keeps the pins 24 in contact with the head 17 of the piston; the centering keys 18 pivot around the shafts 16 and the contact arms 19 fall back towards each other. When the pin 10 reaches the circular groove 120, it is at the end of its movement, even if rotation of the control ring 13 is continued.

In addition to the function of centering, the head shown makes it possible to measure the diameter of the centered bore. For this purpose one of the centering keys 18 is provided on its contact arm 19 with an auxiliary lever 30 in which a measuring contact 31 is provided carrying a ball 32 at the free end. The measuring contact 31 is screwed in the auxiliary lever 30 so that the position of the ball 32 relative to the auxiliary lever 30 can be adjusted in order that the space between the centre of the ball 32 and the pivotal axis of the centering key 18 is equal to the distance between the centre of the ball 20 of the centering key 18 and the pivotal axis of the said centering key 18. In this manner a ratio of 1 : 1 is obtained between the displacements of the ball 20 of the centering key 18 and those of the ball 32 of the measuring contact 31, because both balls 20 and 32 are simultaneously displaced over the same circle centered on the shaft 16.

The ball 32 of the measuring contact 31 acts on a feeler or sensor 33, comprising a cylinder 34 which is secured to the body 1 and in which a piston 35 slides having a longidudinal milled portion 36 in which a pulse ruler 37 is secured, marked in a suitable manner and disposed in front of a pickup without contact, comprising an optical reading head 38 provided on the cylinder 34. The optical reading head 38 is connected to an apparatus (not shown) for treating the pulses which it delivers for counting and displaying them. The measuring contact 31 extends through a slot 39 formed in the cylinder 34 and the ball bears against the head of the piston 35. Hence, when the auxiliary lever 30 pivots, driven by the centering key 18, the measuring contact also pivots and the ball 32 displaces the piston 35 in the cylinder 34, a spring (not shown) ensuring the return of the said piston. As it is displaced, the piston 35 drives the pulse ruler 37 which moves to the reading head 38 which effects the optical sweep of the marks of the pulse ruler and delivers signals representative of the displacements of the piston 35 and, consequently, of the measuring contact 31 and that of the centering key 18. According to the treatment effected on the said signals, it is then possible to obtain the measurement and the display of the beam or the diameter of the centered bore.

The centering head described may obviously be used not only to effect the centering of the bores but it may also supply the measurement of the centered bore — in which case both operations will be simultaneous.

Due to the fact that the pin 10 is engaged in the helical groove 12 of the ring 13 with a certain degree of play, the centering keys 18 have a resilient degree of movement corresponding to the resilient movement of the piston 2 within the range of play of the pin 10.

Further to the fact that, due to this arrangement, the bearing force, with which the centering keys 18 effect the centering, is provided only by the spring 8, the system acts as a buffer and prevents damage which may be caused by shock on the centering keys.

The arrangement of the contacts, mounted to pivot on the eccentric shaft 16 and the control thereof by the piston, makes it possible to obtain a very considerable movement of the contact arms of the centering keys, and the centering head can then be used for a considerable range of bores. It will be appreciated that the centering keys are readily interchangeable without dismantling or changing anything on the centering head because it is only necessary to disengage the shoulders 26 of the washer 27 in order to pivot the control arms 21 and release the centering V-shaped members 22 of the shafts 16. Mounting the centering keys is effected by the reverse operation.

Although the sensor 33 comprises the combination of cylinder 34, piston 35, pulse ruler 37 and optical reading head 38 — this arrangement is not a limitation and the measuring contact 31 may act on a sensor of any other type.

Finally, use of the gripping (clamping) cone 7 for securing the centering head to the measuring machine is not to be regarded as a limitation and any other suitable securing means may be used.

The modification shown in FIG. 2 differs from the centering head of FIG. 1 only by the control of the displacements of the piston 2 actuating the centering keys 18. Finally, in this modification the pin 10 which projects through the longitudinal slot 11 of the body 1, is simply provided with an operating button 40. There is therefore no control ring or helical groove retaining the pin 10, and the spring 8 constantly repels the piston 2 which consequently keeps the centering keys 18 in their separated position. It follows that, for effecting centering, it is only necessary to act manually on the button 40 in the direction of the arrow F to urge the piston 2 against the bias of the spring 8 and to bring the centering keys 18 into their lowered position, as shown in FIG. 2. The centering keys are then introduced into the bore which has to be centered and possibly measured and the oerating button 40 is released. The spring 8 then repels the piston 2 which acts on the centering keys which separate until the balls 20 are in contact with the walls of the bore and displace it with the moveable table along the X and Y axes to centre it on the spindle Z or displace the latter to centre it on the bore if the table is stationary. When centering and, if necessary, measuring of the bore are being effected, the operating button is pushed in the direction of the arrow F for lowering the centering keys towards each other, the said centering keys are disengaged from the bore and the operating button 40 is released, the centering keys then resuming their retracted position as a result of the action of the spring 8. The other operations and constructions of this modification are identical with those of the embodiment shown in FIG. 1 and will not be described again.

The second embodiment shown in FIG. 3 is identical with that of FIG. 1 with regard to the general design and centering operation and these will not be described again. This embodiment differs only with regard to the structure making it possible to effect measurements of diameter. In fact, diameter measurements are made in this embodiment by analogical reading of the angular displacements of the control ring 13. For this purpose, the ring 13 is provided with a graduation 41 co-operating with a vernier mark 42 on the body 1, on the other hand, given the geometry of the pivoting of the centering keys 18, there is no linearity between the displacements of the piston 2 and those of the centering keys 18. It is therefore preferable to shape the surface of the head 17 of the piston 2 on which the gudgeon pins 24 bear in order to provide it with a profile of a cam surface ensuring linearity between the displacements of the piston 2 and those of the centering keys — a feature which makes it possible to provide the control ring 13 with a regular graduation 41 requiring no interpolation. Finally, in order to ensure the precision and repetition of the measurement, the control ring 13 carries a co-axial friction sleeve 43, the friction coefficient of which is such that it slides at an angle over the control ring 13 when it is displaced against the force of the spring 8, that is to say, when the control ring 13 is subjected to the thrust of the said spring 8 by the bearing of the pin 10 against the helical groove 12.

The operation of the centering head is as follows: The separation of the centering keys 18 is effected as in the embodiment shown in FIG. 1, that is to say, by rotation of the control ring 13 which causes the helical groove 12 to pass in front of the end of the pin 10 and permits axial displacement thereof along the slot 11 of the body 1, whilst the spring 8 displaces the piston 2 which separates the centering keys 18. When the balls of the centering keys are in engagements with the walls of the bore, rotation of the control ring 13 is continued so that, due to the angular play of the said ring relatively to the pin 10, the bearing force with which the centering keys effect the centering of the bore and keep it in a centered position is achieved only by the spring 8.

In order to effect the measurement of the centered bore, the control ring 13 is turned in the opposite direction by means of the friction sleeve 43. Due to the coefficient of friction of the latter, when the helical groove 12 of the control ring 13 comes into contact with the pin 10, said control ring meets the thrust of the spring 8 and the friction sleeve 43 slides at an angle over the control ring without the helical groove 12 being able to repel the pin 10. It is then possible to read the measurement of the diameter centered by the centering keys 18 on the graduation 41 co-operating with the mark 42. Due to the sliding of the friction sleeve 43, reading is always effected at the moment of contact of the helical groove 12 with the pin 10 and in this way good repetition of the measurement is obtained.

In order to disengage the centering head, the control ring 13 is actuated directly for the helical groove 12 to repel the pin 10 along the slot 11, the pin driving, against the action of the spring 8, the piston 2 which, in turn, drives the centering keys 18, the contact arms 19 of which fall back towards each other.

The modification shown in FIG. 4 differs from the centering head of FIG. 3 merely in that the reading of the angular displacements of the control ring is digital. For this purpose, the control ring 13 carries a pulse disc 44 marked in a suitable manner and in front of which a pick-up without contact is located comprising an optical reading head 45 secured in a suitable manner (not shown) to the body 1. The optical reading head is connected to an apparatus (not shown) adapted to treat the pulses it delivers for counting and deducting (discounting) and displaying them. As in the embodiment shown in FIG. 3, the measurement is read after rotation of the control ring 13 by means of the friction sleeve 43 to terminate at the moment of contact of the helical groove 12 with the pin 10.

According to one modification (not shown) of the centering head, it is proposed that the measuring function should be effected neither by means of an auxiliary lever connected to one of the centering keys nor by digital or analog reading of the angular displacements of the control ring, but by reading of the axial displacements of the piston 2, the head of which is designed so that the surface on which the pins 24 bear has a profile or cam surface ensuring linearity between the displacements of the piston and those of the centering keys. In this case, it will be preferable to use an electronic sensor located in the piston 2 to pick up the axial displacements thereof — it being possible to use this arrangement with the structure in which the displacements of centering keys are monitored by a control ring having a helical groove as well as with the structure in which the movement of the centering keys are controlled by direct action on the pin connected to the piston (FIG. 2).

Although the described centering head is provided with three centering keys displaced through 120°, this arrangement is not a limitation and any other relative angular positioning of the centering keys is possible. On the other hand, it is proposed to use only two centering keys located at 180° relatively to each other, for example to effect centering and measuring in cavities or openings of a non-circular shape.

What we claim is:

1. A centering and measuring head for measuring machines, comprising:
   a. a tubular body;
   b. a piston slidably mounted within said body for longitudinal movement therein;
   c. a resilient means biasing said piston towards one end of said tubular body;
   d. at least two transverse shafts disposed at said one end of said tubular body, said shafts being tangential with an imaginary circle concentric with the axis of the piston;
   e. cylindrical pin means;
   f. at least two centering keys disposed at said one end of said tubular body, each said centering keys formed of a contact arm assembled to a control arm in a substantially L-shape, and each of said control arms comprises two alternate V-shaped parts having ridges which are parallel to each other, and one of said V-shaped parts is oriented in a direction opposite to the piston head and applied against said shaft with its ridge parallel thereto, the other V-shaped part being oriented in the direction of the piston head and engaged on said cylindrical pin means parallel to the ridge thereof and bearing against the piston head;
   g. means for connecting said control arms of said centering keys to said piston;
   h. means for controlling the displacements of said piston against the bias of said resilient means; and
   i. bar means connected to each of said control arms and inserted into the ends of said cylindrical pin means, whereby said cylindrical pin means is connected to the V-shaped part with a certain floating play.

2. A centering and measuring head according to claim 1, further comprising:
   a. an auxiliary lever mounted on one of said contact arms;
   b. a sensor secured to said tubular body; and c. a measuring feeler mounted on said auxiliary lever for actuating said sensor.

3. A centering and measuring head according to claim 2, wherein said measuring feeler is movably mounted on said auxiliary lever, whereby the position of said measuring feeler is adjustable relative to the auxiliary element.

4. A centering and measuring head according to claim 1, further comprising:

a. a longitudinal slot formed in said tubular body;
b. a transverse pin fixed to said piston, said pin extending through said longitudinal slot to extend out of the body;
c. a control ring rotatably mounted on said body over said slot; and
d. a helical groove formed in said control ring, said helical groove engaging said pin and having a cross section greater than that of the pin.

* * * * *